United States Patent [19]
Sowers et al.

[11] 3,774,788
[45] Nov. 27, 1973

[54] LOADING AND UNLOADING DEVICE

[75] Inventors: Blaine E. Sowers, Grabill; Vaughn E. Hunnicutt, Fort Wayne, both of Ind.

[73] Assignee: North American Van Lines, Inc., Fort Wayne, Ind.

[22] Filed: Feb. 7, 1972

[21] Appl. No.: 224,094

[52] U.S. Cl. ................ 214/75 H, 212/65, 254/142
[51] Int. Cl. ............................................. B60p 1/54
[58] Field of Search .................. 214/75 H, 620; 254/139, 142; 212/65; 211/96, 102, 176; 52/36; 248/243

[56] References Cited
UNITED STATES PATENTS

| | | | |
|---|---|---|---|
| 3,578,179 | 5/1971 | Fujioka | 214/75 H |
| 3,174,592 | 3/1965 | Berman et al. | 52/36 |
| 3,645,486 | 2/1972 | Ferdinand et al. | 248/243 |
| 2,862,628 | 12/1958 | Coates et al. | 214/75 H |
| 3,486,632 | 12/1969 | Balch | 211/87 |
| 2,678,793 | 5/1954 | Brochstein | 248/243 |
| 2,985,482 | 5/1961 | Lion | 214/515 |

Primary Examiner—Gerald M. Forlenza
Assistant Examiner—Lawrence J. Oresky
Attorney—Harold B. Hood et al.

[57] ABSTRACT

The invention is a portable loading and unloading device which comprises a mast adapted to be received in any one of the complementary shaped recesses of the sidewall of a cargo compartment. The mast is provided with means for securing the mast in the recess against movement in a direction laterally outwardly from the sidewall. The sidewall of the cargo compartment and the sides of the recess prevent lateral movement of the mast in other directions. The foot of the mast supports the entire loading and unloading device and the load carried thereby on the floor of the cargo compartment. Pivotably secured to the mast is a boom swingable about an axis extending generally parallel to the longitudinal dimension of the mast.

15 Claims, 3 Drawing Figures

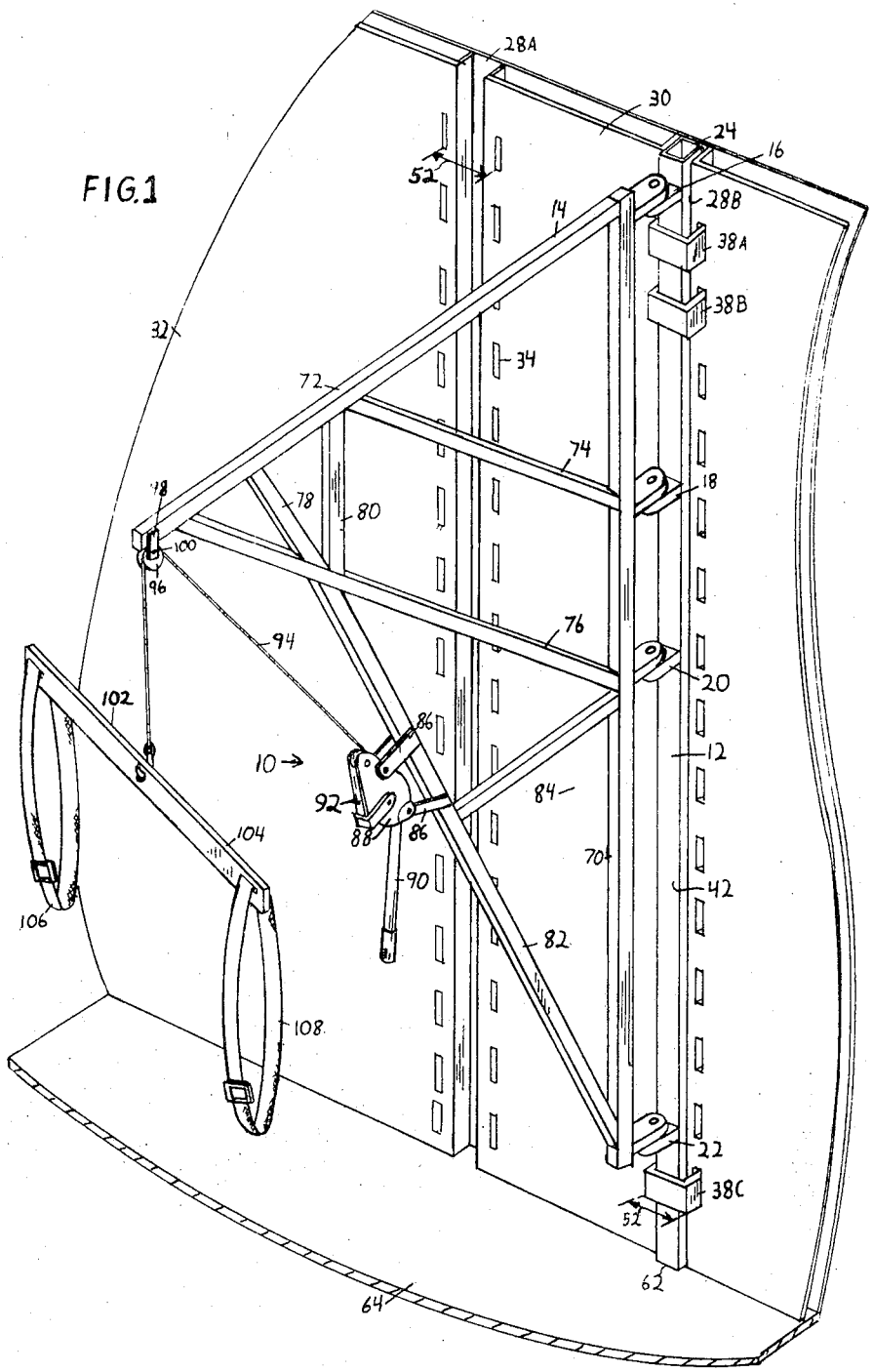

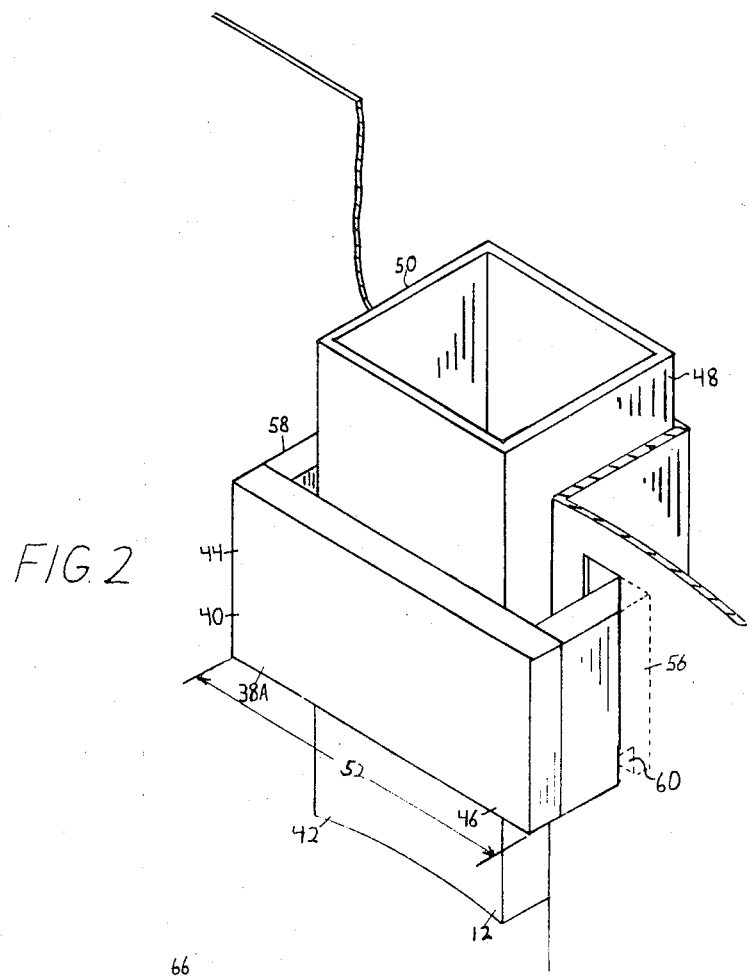
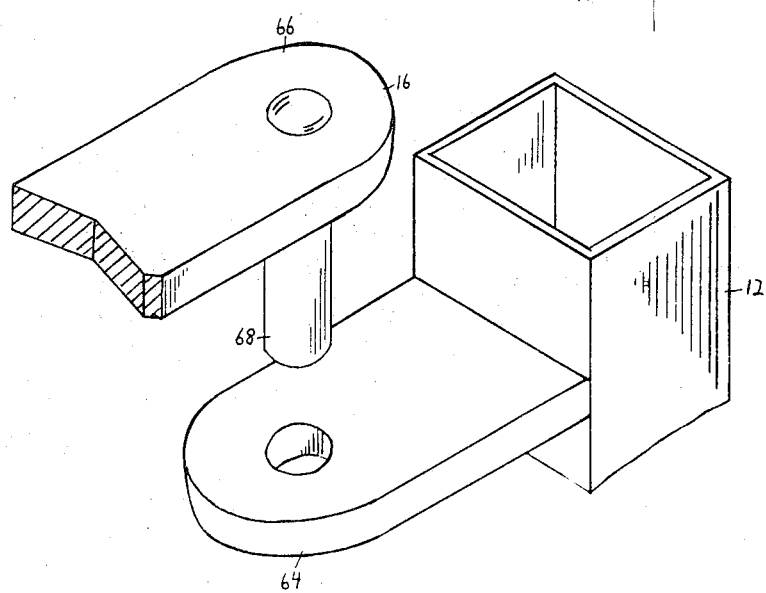

LOADING AND UNLOADING DEVICE

BACKGROUND OF THE INVENTION

1. Field of the Invention

The present invention relates to devices for loading and unloading and more particularly to a portable device which is adapted to be received by and detachably secured to the sidewall of a cargo compartment of a moving van, railroad car or the like without modification thereto.

2. DESCRIPTION OF THE PRIOR ART

Various forms of prior art devices are used to assist in loading and unloading cargo into and out of cargo compartments. Such devices would be of special value for use with vehicles such as moving vans, which are used for transporting household goods, and railroad boxcars. Frequently these vehicles are loaded and unloaded at sites where no facility for loading and unloading, such as an elevated dock, an overhead crane, or the like, is provided.

While devices have heretofore been provided for use in the cargo compartments of moving vans, they have been relatively expensive and have been permanently attached to the van. Further, such devices have occupied a portion of the cargo area such that less cargo can be carried by the van; some such devices have restricted the use of vans equipped with the devices because of the cargo space occupied by the loading and unloading device.

The cargo compartment of a moving van is provided with a sturdy floor and upstanding sidewalls having a plurality of spaced apart vertically extending recesses therein with adjacent holes in which cargo straps are conventionally attached. The walls of such cargo compartments are of insufficient strength to support a loading and unloading device secured thereto and relatively heavy loads carried thereby, for example, a piano or the like. However, such a device which could be attached to the wall has an advantage over some prior art devices inasmuch as the full vertical height of the cargo compartment could be utilized for cargo. Further, a portable device which could be removably attached to the wall of a cargo compartment of a moving van would be highly desirable inasmuch as one such moving device could be used in loading and unloading several different vans. Such a device could also be removed from the van so as to limit loss from theft. It would therefore be highly desirable to provide a portable loading and unloading device which could be detachably secured to the upstanding wall of a cargo compartment of a moving van or the like which would be economical to manufacture and convenient to use.

SUMMARY OF THE INVENTION

The invention, in its broader aspects, is a loading and unloading device which comprises a mast adapted to be received in a complementary shaped recess in the sidewall of a cargo compartment. The mast includes a latch for securing the mast in the recess against movement in a direction outwardly therefrom. The lower extremity of the mast is provided with a foot for vertically supporting the mast and the load carried thereby on the floor of the cargo compartment. A boom is pivotably secured to the mast for swinging movement about a generally vertical axis. Because the recess within which the mast is received is a conventional part of a cargo compartment, the device can be used with a number of different cargo compartments simply by removing it from one and installing it in another.

In a specific embodiment, the mast includes a manually operable winch having a cable windingly attached thereto, the distal end of the cable being provided with a conventional appliance harness or other apparatus for securing a load thereto.

It is therefore an object of the invention to provide an improved loading and unloading device for use in a cargo com-partment.

It is another object of the invention to provide a portable loading and unloading device which can be removably attached to and supported by the conventional wall and floor structure of a cargo compartment.

It is still another object of the invention to provide such a device which can be used with a conventional moving van.

It is yet another object of the invention to provide such a device which is economical to produce and convenient to use.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective view of the loading and unloading device of the invention shown secured to a fragmentary portion of a cargo compartment;

FIG. 2 is a fragmentary perspective view of the loading and unloading device showing details of the latch of the device; and FIG. 3 is a fragmentary perspective view of the loading and unloading device showing details of the hinges.

DESCRIPTION OF THE PREFERRED EMBODIMENT

Referring now to the drawings there is illustrated a loading and unloading device 10 which includes an upstanding mast 12 and a boom assembly 14 pivotably secured to the mast 12 by a plurality of hinges 16, 18, 20 and 22. Mast 12 has a longitudinal axis 24 and a rectangular cross section whereby mast 12 is adapted to be received within a selected one of a plurality of elongated, rectangular, vertically positioned recesses 28a and 28b which are provided in the upstanding sidewall 30 of a vehicle cargo compartment such as indicated generally at 32.

Recesses 28a, 28b are a conventional part of a vehicle cargo compartment 32. There are also provided a plurality of perforations or holes as at 34 adjacent recesses 28a, 28b, perforations 34 being arranged in vertically, spaced apart columns as shown. These perforations are again a conventional part of the cargo compartment of vehicles such as moving vans and railroad boxcars, the perforations normally being used to fasten cargo straps used to secure the load within the cargo compartment.

When mast 12 is positioned within a recess 28b as illustrated, it is supported against movement in three lateral directions by the walls of the recess. To provide a means for securing the mast 12 in the recess 28b and prevent movement thereof outwardly of the recess 28b there are provided a plurality of latch means 38a, 38b, and 38c.

As can best be seen in FIG. 2, each of the latch means 38a through 38c includes a laterally extending bar portion 40 which is secured to the outwardly facing surface 42 of mast 12 as by welding. The length of bar 40 is greater than the width of mast 12 whereby the distal ends 44, 46 of bar 40 extend laterally outwardly from the sides 48, 50 of mast 12. The length of bar 40 has a dimension 52 equal to the lateral distance between the outwardly disposed edges of related pairs of perforations 34.

Each of the latches 38a through 38c further includes a pair of hook elements 56, 58 which are secured to the distal ends 44, 46 of bar 40, respectively, and extend in parallel, spaced apart relationship to sides 48, 50 of mast 12. The cross section of each hook element 56, 58 is complementary to the shape of the perforations 34 whereby, when mast 12 is received within recess 28a, the distal ends of hook elements 56, 58 are slidably received into the perforations.

Formed in the lower surface of elements 56, 58 are suitable notches as at 60 which, when hook elements 56, 58 have been inserted into the perforations 34, permit the latch means 38a to be moved downwardly into a position wherein the notches 60 engage a portion of the sidewall 30 thereby securing the mast 12 within the recess 28a.

The latch means 38a through 38c are secured to the mast 12 in vertically, spaced apart relationship in positions wherein each of the latch means 38a through 38c is in registry with predetermined ones of the perforations 34. Due to the force distribution upon the mast 12, two of the latch means 38a and 38b are secured to the mast 12 adjacent its upper end while a single latch means 38c is secured to the lower end thereof.

The lower end 62 of the mast 12 is provided with a foot which abuttingly engages the floor 64 of the compartment 32 to support the entire loading and unloading device 10 and the load carried thereby. The hook elements 56, 58 are positioned with respect to the perforations 34 and the notches 60 are sized and shaped such that the notches 60 engage sidewall 30 to prevent outward movement of mast 12 from the sidewall 30 when the foot or lower end 62 engages the floor 64, but do not support to any appreciable extent the weight of the device 10 or the load carried thereby. Ideally, the entire weight of the loading and unloading device and the load carried thereby is borne by the floor 64 and the latches 38a through 38c only prevent the mast 12 from moving outwardly from the sidewall 30 and out of the recess 28a.

As best seen in FIG. 3, hinge 16 includes a fixed portion 65 and a pivotable portion 66. Fixed portion 65 is fixedly secured to mast 12 as by welding and extends horizontally outwardly therefrom. Pivotable portion 66 is similarly fixedly secured to the boom assembly 14 as by welding and is provided with a vertically extending hinge pin 68 adjacent its distal end. Fixed portion 65 is provided with a hinge pin hole 67 proportioned to slidably receive hinge pin 68. Hinges 18, 20, and 22 are constructed identically to hinge 16 and thry require no further description except to note that they are fixedly secured to the mast 12 in vertically, spaced apart relationship.

Boom assembly 14 includes an upstanding post 70 and a horizontally extending arm 72 having one end thereof fixedly secured to the upper end of post 70 as by welding. A plurality of braces 74, 76, 78, and 80 are welded between arm 72 and post 70 to reinforce the structure and a strut 82 is welded between braces 76 and the lower end of post 70. Thus welded together, the post 70, arm 72, and braces 74 and 76 and strut 82 form a truss capable of supporting a substantial weight while itself being light in weight. Further, the shape of the truss is generally triangular with post 70 and arm 72 being orthogonally disposed with respect to each other whereby, when the truss assembly 84 is extending outwardly from wall 30 of compartment 32, it does not interfere or prevent entry and egress from the compartment. The shape of the truss further provides for clearance of articles being supported by the loading and unloading device.

Adjacent the central portion of strut 82 are welded a plurality of brackets 86 which provide a means for securing a conventional winch device 88. The winch device is a type which typically includes an operating handle 90 and a ratchet and brake mechanism (not shown) and a drum 92 upon which is wound an elongated cable, or the like 94. Such devices are well known in the art and typically, the winch assembly provides for multiplication of the manual effort applied to arm 90 whereby an operator can lift or otherwise control substantial weights therewith.

Cable 94 is trained over a pulley 96 which is rotatably secured to the distal end of arm 72 by means of suitable welded brackets 98 and a hinge pin 100. The distal end of cable 94 is fitted with an appliance harness 102 which includes a rigid, horizontally extending beam 104 and a plurality of securing straps 106, 108, appliance harness 102 providing a means for securing large articles to the element 94. While an appliance harness is illustrated, it will be apparent to those skilled in the art that other forms of harnesses and load securing means may be used.

The device of the invention is thus seen to provide an inexpensive yet rugged device for aiding in the loading and unloading of cargo into and out of a cargo compartment. Because the loading and unloain/dg device is detachably secured to the wall of the cargo compartment, it can be readily removed therefrom and used with any cargo compartment having recesses such as recesses 28a, 28b, thereby obviating the need of providing each vehicle with such a device. The device is light in weight and requires little space in the cargo compartment, and again, because the device is detachable and portable, it can be removed and stored in any convenient place. Further, the device is adapted to utilize conventional structure typically found in the cargo compartments of most vehicles such as moving vans and railroad boxcars or the like and can be installed thereon without any modification thereto.

While there have been described above the principles of this invention in connection with specific apparatus, it is to be clearly understood that this description is made only by way of example and not as a limitation to the scope of the invention. What is claimed is:

1. A loading and unloading device comprising a boom, means pivotally connected to said boom for securing the same to the sidewall of a cargo compartment, said means including a first portion to be received in a complementary shaped recess adjacent to a row of vertically spaced perforations in said sidewall and a second portion for latching said boom to said sidewall and holding said first portion in said recess, said second portion including a plurality of spaced apart hook elements in registry with predetermined ones of said perforations, said hook elements including a portion adapted to be laterally, slidably received in predetermined ones of said perforations and to vertically, slidably engage a portion of said sidewall, said boom being pivotally swingable in relation to said securing means about an axis which is generally vertical when said boom is latched to said sidewall, said securing means maintaining said axis in said generally vertical position.

2. The device of claim 1 wherein said first portion and said recess are elongated and have rectangular cross sections in a direction generally perpendicular to the longitudinal dimensions thereof, said first portion and recess cross sections being complements of each other.

3. The device of claim 1 wherein there is a plurality of said perforations adjacent each side of said recess, said hook elements each including two of said hook element portions.

4. The device of claim 1 wherein said hook element portion comprises a rectangular bar of rigid material having a cross section complementary to the shape of said perforations, said bar extending generally perpendicular to said wall when said boom is mounted on said wall and including a downwardly facing notch therein adjacent the distal end thereof.

5. The device of claim 1 wherein the lower end of said securing means is adapted to abuttingly engage the floor of said cargo compartment, said end and hook elements being spaced relative to the floor and perforations of said cargo compartment sidewall such that said end abuts said floor when said hook elements engage said sidewall.

6. The device of claim 1 further comprising a hoist mechanism fixedly secured to said boom.

7. The device of claim 6 wherein said hoist includes a manually operable winch.

8. The device of claim 1 wherein said boom is a multimember truss.

9. The device of claim 8 wherein said truss is generally triangular in shape having a base side and an altitude side, the altitude side of said truss being disposed adjacent said securing means and extending generally parallel thereto, the base side of said truss extending generally perpendicular to said securing means and adjacent the upper end thereof.

10. For use with a vehicle cargo compartment which includes a floor and a sidewall, the sidewall having at least one elongated vertically extending channel therein and a column of perforations therethrough adjacent each side of the channel, a loading and unloading device comprising an elongated mast having a lateral cross section complementary to the lateral cross section of the channel and adapted to be received therein, a boom, hinge means for securing said boom to said mast for swinging movement about an axis ganerally parallel to the longitudinal dimension of said mast, and a plurality of latch elements fixedly secured to said mast in vertically spaced apart relationship wherein, when said mast is received in said channel, each of said elements is in registry with predetermined ones of the perforations, said elements each including a pair of hook portions slidably received in said predetermined ones of said perforations and adapted to engage portions of said sidewall between said predetermined ones of said perforations and the next downwardly adjacent perforations.

11. For use in a vehicle cargo compartment wherein the channels in the sidewalls thereof are rectangular in cross section, the device of claim 10 wherein the cross section of said mast is rectangular, three sides of said mast engaging three sides of said channel, said latch element including a horizontally extending portion fixedly secured to the outwardly facing surface of said mast, said hook portions having a cross section complementary to the shape of said perforations and extending generally perpendicular to said portion.

12. The device of claim 11 wherein there are three of said latch elements, two of said latch elements being secured to said mast adjacent the upper end thereof, the third said latch element being secured to said mast adjacent the lower end thereof.

13. The device of claim 10 wherein said mast further includes a base adapted to abuttingly engage the floor of said compartment when said latch elements engage said sidewall portions whereby said loading and unloading device and the load carried thereby is supported thereon.

14. The device of claim 10 wherein said boom comprises a plurality of members welded together to form a right-triangular truss, one of the orthogonally disposed sides of said truss being disposed adjacent said mast in parallel, spaced apart relationship thereto, the other of the orthogonally disposed sides of said truss extending generally perpendicular to said mast adjacent the upper end thereof.

15. The device of claim 13 wherein said boom further includes a pulley rotatably secured to the apex of said truss remote from said mast, a cable trained over said pulley and a manually operable winch fixedly secured to said truss and operatively coupled to said cable, and means secured on the opposite end of said cable for securing a load thereto.

* * * * *

UNITED STATES PATENT OFFICE
CERTIFICATE OF CORRECTION

Patent No. 3,774,788     Dated November 27, 1973

Inventor(s) Blaine E. Sowers and Vaughn E. Hunnicutt

It is certified that error appears in the above-identified patent and that said Letters Patent are hereby corrected as shown below:

SPECIFICATION

Column 2, line 10, "com-partment" should be --compartment--.

Column 3, line 60, "thry" should be --they--.

IN THE CLAIMS

Claim 10, col. 6, lines 4-5, "gan-erally" should be --gen-erally--.

Signed and sealed this 23rd day of April 1974.

(SEAL)
Attest:

EDWARD M. FLETCHER, JR.
Attesting Officer

C. MARSHALL DANN
Commissioner of Patents